US012587560B2

(12) United States Patent
Romanov et al.

(10) Patent No.: US 12,587,560 B2
(45) Date of Patent: Mar. 24, 2026

(54) ACCOUNT TAKEOVER PROTECTION USING SITE PROFILES

(71) Applicant: Imperva, Inc., San Mateo, CA (US)

(72) Inventors: Ido Romanov, Shaker Heights, OH (US); Aiah Lerner, Ramat Gan (IL); Dmitriy Litvak, San Mateo, CA (US); Matan Lion, Mahane Yafa (IL)

(73) Assignee: Imperva, Inc., San Meto, CA (US)

( * ) Notice: Subject to any disclaimer, the term of this patent is extended or adjusted under 35 U.S.C. 154(b) by 121 days.

(21) Appl. No.: 18/429,155

(22) Filed: Jan. 31, 2024

(65) Prior Publication Data

US 2024/0259418 A1     Aug. 1, 2024

Related U.S. Application Data

(60) Provisional application No. 63/482,566, filed on Jan. 31, 2023.

(51) Int. Cl.
H04L 9/40 (2022.01)
H04L 67/30 (2022.01)

(52) U.S. Cl.
CPC .......... H04L 63/1441 (2013.01); H04L 63/08 (2013.01); H04L 67/30 (2013.01)

(58) Field of Classification Search
CPC ..... H04L 63/1425; H04L 63/08; H04L 67/30; H04L 63/1441
See application file for complete search history.

(56) References Cited

U.S. PATENT DOCUMENTS

| | | | |
|---|---|---|---|
| 2021/0306334 A1* | 9/2021 | Han ..................... | H04L 63/0884 |
| 2023/0032497 A1* | 2/2023 | Zevetchin .......... | G06Q 20/4016 |
| 2023/0259943 A1* | 8/2023 | Chen ...................... | G06F 21/31 |
| | | | 705/75 |

* cited by examiner

*Primary Examiner* — Benjamin A Kaplan

(57) ABSTRACT

A method implemented by a network device is disclosed to detect and mitigate account takeover attempts. The method includes generating a site profile for a site based on analyzing historical login requests to the site, wherein the site profile for the site includes information regarding legitimate login requests to the site and information regarding attacker login requests to the site, intercepting a login request to the site, determining whether the login request is legitimate for the site based on comparing the login request to the site profile for the site, assigning a risk score to the login request based at least in part on a result of the determination of whether the login request is legitimate for the site, determining a mitigation strategy to apply to the login request based on the risk score assigned to the login request, and causing the mitigation strategy to be applied to the login request.

20 Claims, 5 Drawing Sheets

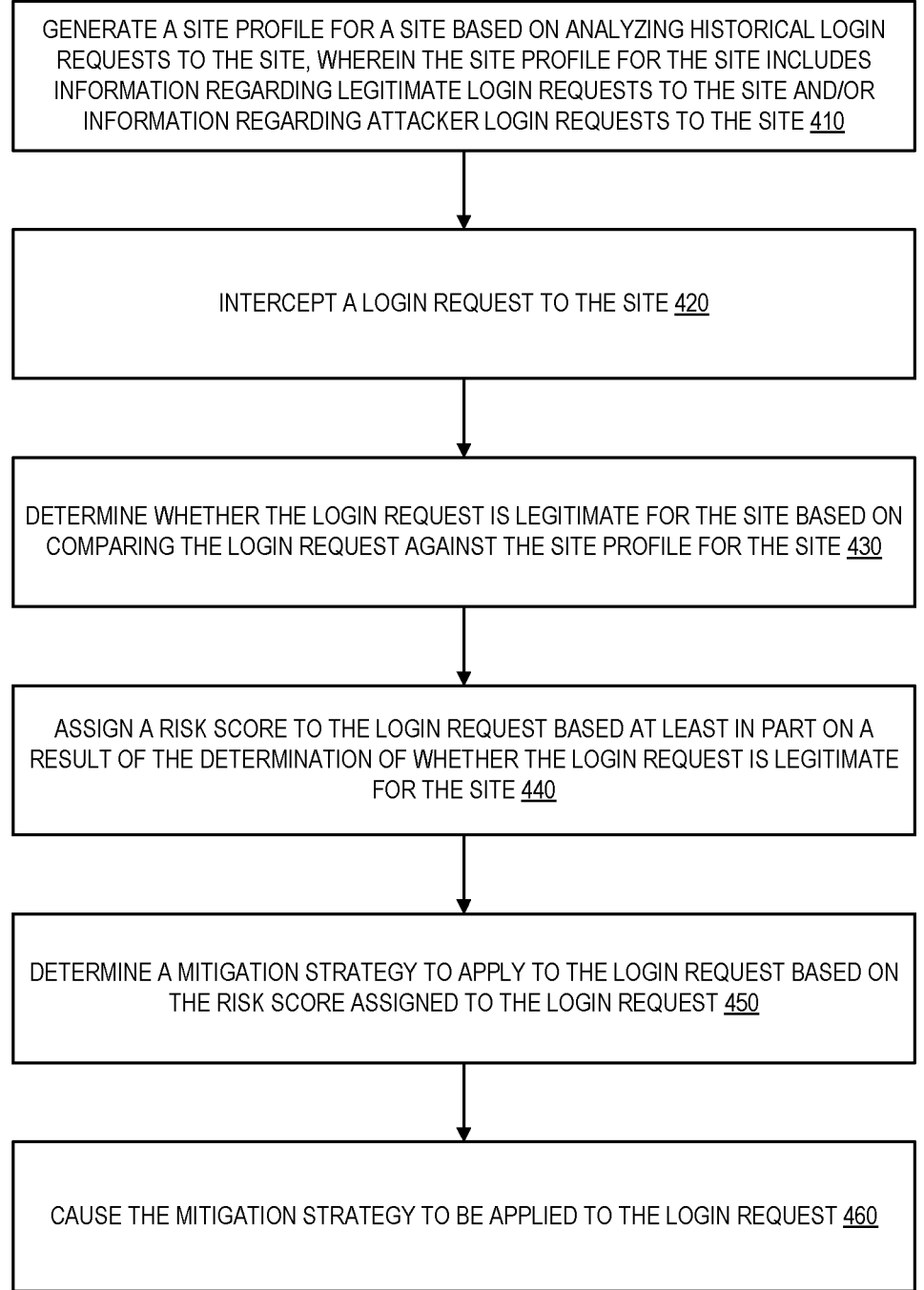

GENERATE A SITE PROFILE FOR A SITE BASED ON ANALYZING HISTORICAL LOGIN REQUESTS TO THE SITE, WHEREIN THE SITE PROFILE FOR THE SITE INCLUDES INFORMATION REGARDING LEGITIMATE LOGIN REQUESTS TO THE SITE AND/OR INFORMATION REGARDING ATTACKER LOGIN REQUESTS TO THE SITE 410

INTERCEPT A LOGIN REQUEST TO THE SITE 420

DETERMINE WHETHER THE LOGIN REQUEST IS LEGITIMATE FOR THE SITE BASED ON COMPARING THE LOGIN REQUEST AGAINST THE SITE PROFILE FOR THE SITE 430

ASSIGN A RISK SCORE TO THE LOGIN REQUEST BASED AT LEAST IN PART ON A RESULT OF THE DETERMINATION OF WHETHER THE LOGIN REQUEST IS LEGITIMATE FOR THE SITE 440

DETERMINE A MITIGATION STRATEGY TO APPLY TO THE LOGIN REQUEST BASED ON THE RISK SCORE ASSIGNED TO THE LOGIN REQUEST 450

CAUSE THE MITIGATION STRATEGY TO BE APPLIED TO THE LOGIN REQUEST 460

Figure 4

ELECTRONIC DEVICE 500

SOFTWARE INSTANCE(S) 502

504A

504R

INSTANCE 506A

VIRTUALIZATION LAYER 508

PROCESSOR(S) 522

NETWORK INTERFACE(S) 524

NON-TRANSITORY MACHINE-READABLE STORAGE MEDIA 526

SOFTWARE 528

HARDWARE 520

ACCOUNT TAKEOVER PROTECTION USING SITE PROFILES

CROSS-REFERENCE TO RELATED APPLICATIONS

This application claims the benefit of U.S. Provisional Application No. 63/482,566, filed Jan. 31, 2023, which is hereby incorporated by reference.

TECHNICAL FIELD

Embodiments of the invention relate to the field of computer network security, and more specifically to detecting and mitigating account takeover attempts.

BACKGROUND

Account takeover is a type of attack where cybercriminals take control of online accounts using stolen credentials (e.g., username and password combinations). Cybercriminals generally purchase a list of credentials via the dark web—which are typically obtained from social engineering, data breaches, and/or phishing attacks. Cybercriminals may deploy bots that automatically access various sites such as travel, retail, finance, eCommerce, email, and social media sites and attempt to log into those sites using the list of credentials. Eventually, attackers arrive at a list of verified credentials (e.g., credentials that resulted in successful log-ins) and make a profit by selling these credentials to others or by abusing the accounts. Account takeover attacks can be seen as a type of identity theft where attackers gain unauthorized access to user credentials and use them for malicious purposes (e.g., to carry out transactions for monetary gain). A characteristic of account takeover is that they impersonate a user to exploit legitimate functionality of a site, rather than exploiting unmitigated vulnerabilities.

Account takeover attempts can be carried out using bots that perform credential stuffing and/or credential cracking on sites. Credential stuffing may involve the automated injection of stolen credentials (e.g., username and password combinations) into site login forms in an attempt to gain unauthorized access to user accounts. Credential cracking may involve the automated injection of multiple passwords into login forms for one or multiple accounts (e.g., trying to "guess" the password for an account) in an attempt to gain unauthorized access to user accounts. Users of sites typically do not modify their login passwords regularly, and they often reuse the same passwords across multiple different sites, which makes them more vulnerable to account takeover attacks.

One way to detect and mitigate account takeover attempts is to use multi-factor authentication (MFA). However, MFA may present unnecessary challenges/prompts to users that negatively impact the user experience. Another way to detect and mitigate account takeover attempts is to evaluate the IP (Internet Protocol) reputation of the device that is being used to login to the site. However, attackers can easily evade such detection mechanisms by changing IP addresses. Another way to detect and mitigate account takeover attempts is to rely on signatures or fingerprints. For example, such approach may involve analyzing traffic per fingerprint or signature (e.g., the fingerprint or signature may be generated based on HTTPS/TLS (Hypertext Transfer Protocol Secure and/or Transport Layer Security) information), and assigning reputation scores to each fingerprint or signature. However, the aforementioned approaches that rely on reputation may not be able to quickly detect account takeover attempts from "new" IP addresses, signatures, or fingerprints that have not been seen before (or that do not have enough history to build a reputation).

BRIEF DESCRIPTION OF THE DRAWINGS

The invention may best be understood by referring to the following description and accompanying drawings that are used to illustrate embodiments of the invention. In the drawings:

FIG. 4 is a flow diagram of a method for detecting and mitigating account takeover attempts, according to some embodiments.

DETAILED DESCRIPTION

Figure 1:
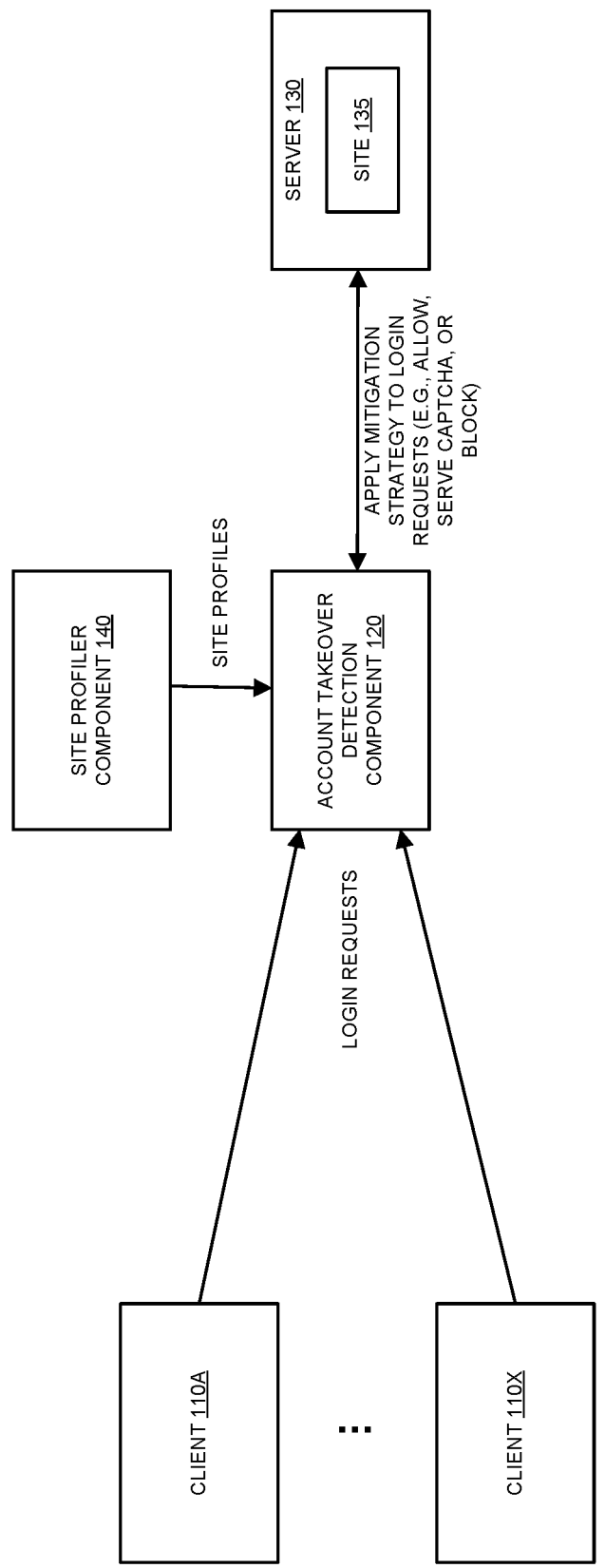
FIG. 1 is a diagram showing an environment in which account takeover attempts can be detected and mitigated, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and example embodiments, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video).

As used herein, server end stations are network devices operable to execute or otherwise implement one or more servers providing content or services to clients. For example, server end stations may implement web application servers, application programming interface (API) servers, database servers, file servers, print servers, mail servers, gaming servers, application servers, and/or Domain Name System (DNS) servers.

As used herein, client end stations (e.g., workstations, laptops, netbooks, palm tops, mobile phones, smartphones, multimedia phones, Voice over Internet Protocol (VOIP) phones, user equipment (UE), terminals, portable media players, Global Positioning Satellite (GPS) units, gaming systems, set-top boxes) are network devices operable to execute or otherwise implement applications that, among other functions, can access the content and/or services provided by servers over a network (e.g., over a local area network (LAN), over the Internet, and/or over virtual private networks (VPNs) overlaid on (e.g., tunneled through) the Internet).

As mentioned above, one way to detect and mitigate account takeover attempts is to use multi-factor authentication (MFA). However, MFA may present unnecessary challenges/prompts to users that negatively impact the user experience. Another way to detect and mitigate account takeover attempts is to evaluate the IP (Internet Protocol) reputation of the device that is being used to login to the site (e.g., and block login attempts from IP addresses that have bad reputations). However, attackers can easily evade such detection mechanisms by changing IP addresses. Another way to detect and mitigate account takeover attempts is to rely on signatures or fingerprints. For example, such approach may involve analyzing traffic per fingerprint or signature (e.g., the fingerprint or signature may be generated based on HTTPS/TLS (Hypertext Transfer Protocol Secure and/or Transport Layer Security) information), and assigning reputation scores to each fingerprint or signature. However, the aforementioned approaches that rely on reputation may not be able to quickly detect account takeover attempts from "new" IP addresses, signatures, or fingerprints that have not been seen before (or that do not have enough history to build a reputation).

Embodiments are disclosed herein that use site-specific knowledge to detect and mitigate account takeover attempts. Embodiments can quickly detect and mitigate account takeover attempts even from "new" devices or IP addresses that have not been seen before. According to some embodiments, a site profiler component generates a site profile for a site based on analyzing historical login requests to the site. The site profile may include information regarding legitimate login requests to the site and information regarding attacker login requests to the site. The information regarding legitimate login requests may include statistics and/or distributions regarding legitimate login requests to the site. As an example, the statistics regarding legitimate login requests to the site may include the total number of legitimate login requests to the site during a given time period, the total number of unique source IP addresses seen in legitimate login requests to the site during the given time period, and/or the total number of unique usernames used in legitimate login requests to the site during the given time period. Also, as an example, the distributions regarding legitimate login requests to the site may include a distribution based on autonomous system number (ASN), a distribution based on user agent (e.g., "User-Agent" included in the HTTP header), a distribution based on client application, and/or a distribution based on originating country. A distribution may include statistics/counts on a per feature basis. For example, a distribution based on ASN may include statistics/counts per ASN, a distribution based on user agent may include statistics/counts per user agent, a distribution based on client application may include statistics/counts per client application, a distribution based on originating country may include statistics/counts per originating counter, and so on. The information regarding attacker login requests may include similar information as the information regarding legitimate login requests, but with respect to attacker login requests. The site profiler component may provide the site profile for the site to an account takeover detection component. The account takeover detection component may determine whether a new login request to the site is legitimate for the site based on comparing the new login request against the site profile for the site. This may involve obtaining information regarding the new login request (e.g., by extracting information from the new login request itself or from contextual information regarding the context surrounding the new login request) and comparing this information against the statistics and/or distributions included in the site profile for the site. For example, the account takeover component may obtain information regarding the new login request indicating that the new login request was originated by a non-mobile application. The account takeover component may compare this information against the site profile for the site, which includes a distribution indicating that 99% of login requests to the site are originated by a mobile application. In this case, the account takeover component may determine, based on the comparison, that the new login request is not legitimate for the site (and is most likely an attacker login request). The account takeover detection component may assign a risk score to the new login request based at least in part on the result of the determination of whether the new login request is legitimate for the site (e.g., assign a relatively higher risk score if the login request is determined to be legitimate for the site and assign a relatively lower risk score if the login request is determined not to be legitimate for the site). The account takeover detection component may determine a mitigation strategy for the new login request based on the risk score assigned to the new login request. For example, the account takeover detection component may determine that the new login request should be blocked if the risk score assigned to the new login request indicates that the new login request presents a high (security) risk, determine that a challenge-response test (e.g., a Completely Automated Public Turing test to tell Computers and Humans Apart (CAPTCHA)) should be served to the user if the risk score assigned to the new login request indicates that the new login request presents a medium risk, or determine that the new login request should be allowed to proceed if the risk score assigned to the new login request indicates that the new login request presents a low risk. The account takeover detection component may then cause the determined mitigation strategy to be applied to the new login request. Further embodiments are now described with reference to the accompanying figures.

FIG. 1 is a diagram showing an environment in which account takeover attempts can be detected and mitigated, according to some embodiments.

As shown in the diagram, the environment includes clients 110A-X, an account takeover detection component 120, a site profiler component 140, and a server 130.

The server 130 may host a site 135 that requires users to login (e.g., using a login form/page) to access one or more functionalities of the site 135. For example, the site 135 may require that users enter valid credentials (e.g., a username and password combination) to access one or more functionalities of the site 135. The site 135 may be, for example, a financial/banking site, a social media site, a retail site, a travel site, a government benefits site, a messaging/communication application site, a health care site, or an email hosting site. The site 135 may correspond to an entire application/site (e.g., a web application or web site) or a particular component of an application/site that is desired to be isolated for account takeover detection purposes (e.g., particular web pages or functionality within the web site). The server 130 may be implemented by one or more server end stations. In an embodiment, the server 130 is implemented in a cloud.

Clients 110 may send login requests to the server 130 (e.g., over a network such as the Internet) to login to the site 135. In an embodiment, the login requests take the form of Hypertext Transfer Protocol (HTTP) or Hypertext Transfer Protocol Secure (HTTPS) requests. Each of the clients 110 may be implemented by one or more client end stations. The server 130 may determine whether the credentials submitted in/with the login request are valid and only allow the user to log in and have access to the site 135 if the credentials are valid.

The site profiler component 140 may generate a site profile for the site 135 based on analyzing historical login requests to the site 135 (e.g., login request to the site 135 from the past 30 days). The site profile for the site 135 may include information regarding legitimate login requests to the site and information regarding attacker login requests to the site (e.g., login requests that are deemed to be account takeover attempts). The site profiler component 140 may provide the site profile for the site 135 to the account takeover detection component 120. The site profiler component 140 may be implemented using one or more network devices. Additional details of the site profiler component 140 and the site profile are described further herein below with reference to FIG. 2.

The account takeover detection component 120 may be communicatively situated between the clients 110 and the server 130 such that it can intercept or otherwise obtain the login requests sent by the clients 110 to the server 130 to access the site 135. The account takeover detection component 120 may determine whether a login request is legitimate for the particular site 135 based on comparing the login request against the site profile for the particular site 135. The account takeover detection component 120 may then assign a risk score to the login request based, at least in part, on the result of the determination of whether the login request is legitimate for the particular site 135. The risk score assigned to the login request may indicate the level of (security) risk that the login request presents. The account takeover detection component 120 may then determine a mitigation strategy for the login request based on the risk score assigned to the login request. In an embodiment, the possible mitigation strategies include blocking the login request ("block"), serving a CAPTCHA (Completely Automated Public Turing test to tell Computers and Humans Apart) or similar challenge-response test ("serve CAPTCHA"), or allowing the login request to proceed to the server 130 ("allow"). Once the account takeover detection component 120 determines the mitigation strategy for the login request, it may cause that mitigation strategy to be applied to the login request (e.g., by applying the mitigation strategy itself or causing another security mechanism (e.g., a web application firewall) to apply the mitigation strategy). The account takeover detection component 120 may be implemented by one or more network devices. Additional details of the account takeover detection component 120 are described further herein below with reference to FIG. 3.

For sake of simplicity of illustration and explanation, the diagram shows a single site 135. However, embodiments are not so limited. Embodiments can be used to detect and mitigate account takeover attempts for multiple sites. In such embodiments, the site profiler component 140 may generate a separate site profile for each site (e.g., based on analyzing historical login requests to that particular site) and provide those site profiles to the account takeover detection component 120. The account takeover detection component 120 may detect and mitigate account takeover attempts on the site using the corresponding site profile for the site.

A certain arrangement of components is shown in the diagram to illustrate an example embodiment. However, it should be appreciated that other embodiments may use a different arrangement than shown in the diagram to achieve the same/similar functionality. In an embodiment, the site profiler component 140 and/or the account takeover detection component 120 are deployed in a cloud (e.g., a cloud provided by a cloud provider such as Amazon®, Microsoft®, etc.) and/or on premise (e.g., in an enterprise network that implements the server 130).

Figure 2:
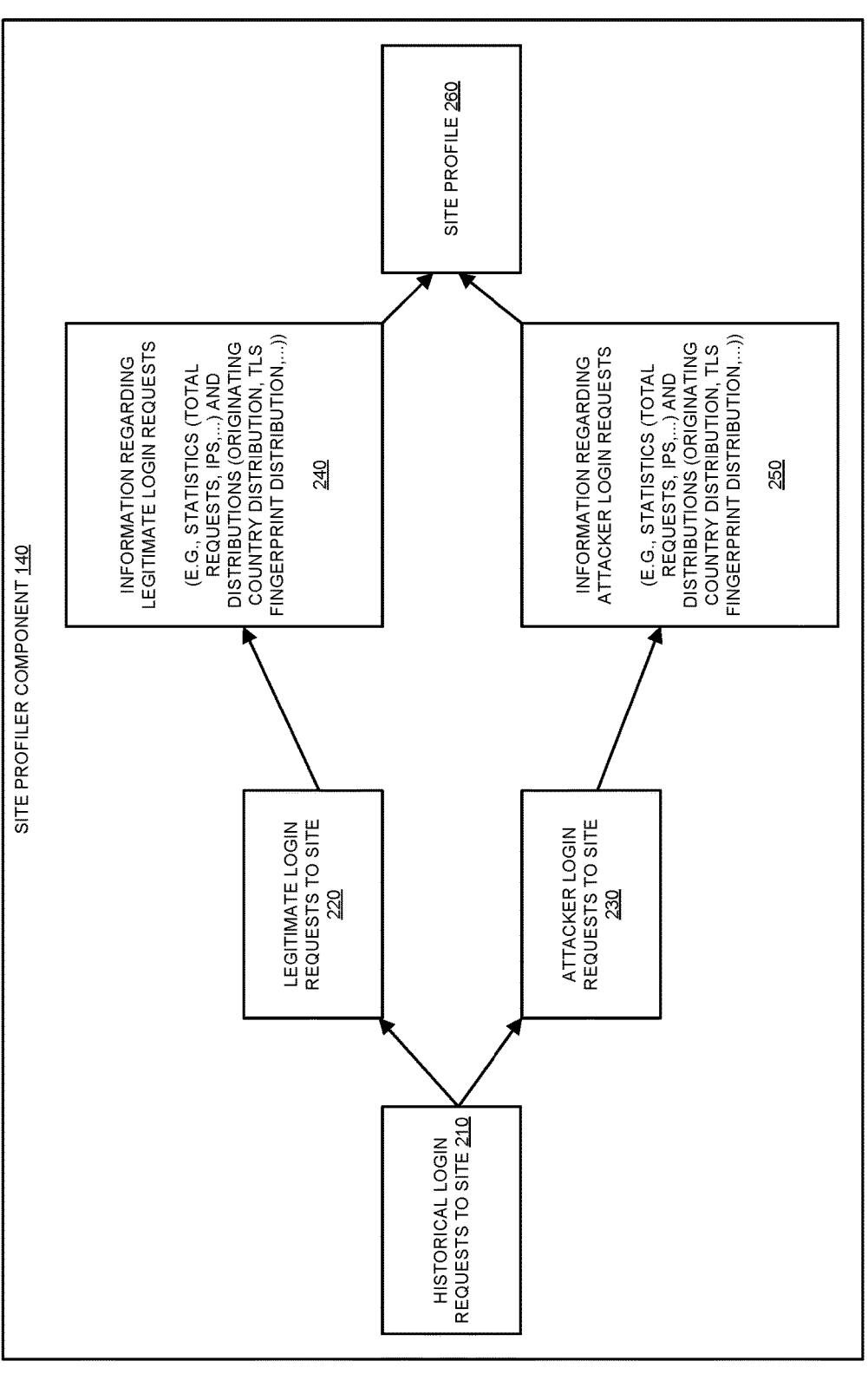
FIG. 2 is a diagram showing how the site profiler component can generate a site profile for a site, according to some embodiments.

FIG. 2 is a diagram showing how the site profiler component can generate a site profile for a site, according to some embodiments.

The site profiler component 140 may obtain historical login requests to the site 210 (e.g., login requests to the site over the past 30 days or other length of time) and separate these login requests into legitimate login requests to the site 220 and attacker login requests to the site 230 (e.g., based on manual classification by a security expert and/or other available knowledge). The site profiler component 140 may generate information regarding legitimate login requests 240 and information regarding attacker login requests 250 (e.g., by extracting information from the login requests themselves or from contextual information regarding the relevant contexts surrounding the login requests). The information regarding legitimate login requests 240 may include statistics and/or distributions regarding the legitimate login requests 220. In an embodiment, the statistics regarding the legitimate login requests 220 include the total number of legitimate login requests to the site during a given period of time, the total number of unique (source) IP addresses seen in legitimate login requests to the site during a given period of time, the total number of unique usernames used in legitimate login requests to the site during a given period of time, and/or similar statistics. In an embodiment, the distributions regarding the legitimate login requests 220 include a distribution based on autonomous system number (ASN), a distribution based on user agent, a distribution based on client application, a distribution based on a signature or fingerprint (e.g., a signature or fingerprint can be generated based on contents of HTTP requests (e.g., HTTP header values and/or their order) and/or TLS handshake information (e.g., contents of a TLS client HELLO message)), and/or a distribution based on originating country. A distribution may include statistics/counts on a per feature basis. For example, a distribution based on ASN may include statistics/counts per ASN, a distribution based on user agent may include statistics/counts per user agent, a distribution based on client application may include statistics/counts per client application, a distribution based on signature or fingerprint may include statistics/counts per signature or fingerprint, a distribution based on originating country may include statistics/counts per originating country, and so on. In an embodiment, a distribution regarding the legitimate login requests 220 includes a list of the most common features of legitimate login requests 220 (e.g., a list of the ten most common ASNs that originated legitimate login requests 220, a list of the ten most common user agents that originated legitimate login requests 220, a list of the ten most common client applications that originated legitimate login requests 220, or a list of the ten most common countries that originated legitimate login requests 220). Thus, a distribution for a feature may include statistics/counts for all values seen for the feature or just a subset of the values (e.g., just for the top ten most seen user agents).

Similarly, the information regarding attacker login requests 250 may include statistics and/or distributions regarding the attacker login requests 230 to the site. The statistics and distributions regarding the attacker login requests 230 may be similar to the statistics and distributions regarding the legitimate login requests 220 described above, except that they pertain to the attacker login requests 230.

As a further example, the information regarding legitimate login requests 240 may include a list of the top one hundred countries that originated the legitimate login requests 220, as well as statistics for each of these countries such as the number of login requests that originated from the country during a given period of time, the number of unique usernames used in the login requests that originated from the country during a given period of time, and/or the number of unique source IP addresses seen in the login requests that originated from the country during a given period of time. Similarly, the information regarding attacker login requests 250 may include a list of the top one hundred countries that originated the attacker login requests 230, as well as statistics for each of these countries such as the number of login requests that originated from the country during a given period of time, the number of unique usernames used in the login requests that originated from the country during a given period of time, and/or the number of unique source IP addresses seen in the login requests that originated from the country during a given period of time.

As a further example, the information regarding legitimate login requests 240 may include a list of the top one hundred TLS (Transport Layer Security) fingerprints associated with the legitimate login requests 220 (in addition to or alternatively to the list of the top one hundred originating countries mentioned above), as well as statistics for each of these TLS fingerprints (e.g., the number of legitimate login requests associated with the TLS fingerprint during a given period of time, the number of unique usernames used in login requests associated with the TLS fingerprint during a given period of time, and/or the number unique source IP addresses seen in login requests associated with the TLS fingerprint during a given period of time). Similarly, the information regarding attacker login requests 250 may include a list of the top one hundred TLS fingerprints associated with attacker login requests 230, as well as statistics for each of these TLS fingerprints.

The site profiler component 140 may include the information regarding legitimate login requests 240 and the information regarding attacker login requests 250 in the site profile 260. Thus, in an embodiment, the site profile 260 includes both the information regarding legitimate login requests 240 as well as the information regarding attacker login requests 250. However, in other embodiments, the site profile 260 includes information regarding legitimate login requests 240 but not information regarding attacker login requests 250 (or vice versa).

In an embodiment, the site profile 260 is formatted in a JavaScript Object Notation (JSON) format, although it should be appreciated that the site profile can be formatted in other types of structured formats. An example JSON is provided and further described below. In an embodiment, the site profiler component 140 periodically updates the site profile 260 for a site (e.g., at predefined time frames and/or when additional historical login requests to the site become available to update the site profile 260). Thus, the site profiler component 140 may keep the site profile 260 up to date to reflect the most recent login requests to the site.

An example site profile 260 that is formatted in a JSON format is provided and described below to illustrate an embodiment:

```
Site Profile JSON example
{
  "site_distributions":
  {
    "statistics":
    {
      "min_date": "2022-11-07 00:18:26.198", (START OF TIME PERIOD)
      "max_date": "2022-12-06 10:50:33.722", (END OF TIME PERIOD)
      "total_http_requests": "4698", (TOTAL NUMBER OF REQUESTS)
      "total_ips": "198", (TOTAL NUMBER OF UNIQUE SOURCE IP ADDRESSES)
      "total_usernames": "186", (TOTAL NUMBER OF UNIQUE USERNAMES)
      "days_back": 30 (LENGTH OF TIME PERIOD)
    },
    "normal_distribution":
    {
      "statistics":
      {
        "min_date": "2022-11-07 03:34:17.831",
        "max_date": "2022-12-06 10:50:28.502",
        "total_http_requests": "1509",
        "total_ips": "108",
        "total_usernames": "89"
      },
```

-continued

```
    "asn":
    [
        {
            "name": "22616",
            "total": "1117",
            "ip_count": "38",
            "username_count": "46",
            "success_logins_count": "919",
        },
        . . .
    ],
    "user_agent":
    [...],
    "client_application":
    [...],
    "country_code":
    [...]
}
"attacker_distribution":
    {
        "statistics":
        {...},
        "asn":
        [...],
        "user_agent":
        [...],
        "client_application":
        [...],
        "country_code":
        [...]
    }
  }
}
```

The example site profile 260 above indicates general statistics for the site ("statistics") such as the total number of login requests to the site during a time period ("statistics"→"total_http_requests"), the total number of unique source IP addresses of login requests to the site during the time period ("statistics"→"total_ips"), and the total number of usernames used in login requests to the site during the time period ("statistics"→"total_usernames"). The example site profile 260 also indicates the start time of the time period ("statistics"→"min_date") and the end time of the time period ("statistics"→"max_date"), as well as the length of the time period ("statistics"→"days_back"). The example site profile 260 also indicates statistics and distributions for legitimate login requests ("normal_distribution"). The statistics for the legitimate login requests ("normal_distribution"→"statistics") indicate the start time and end time of the time period ("normal_distribution"→"statistics"→ "min_date" and "normal_distribution"→ "statistics"→"max_date"), the total number of legitimate login requests to the site during the time period ("normal_distribution"→"statistics"→"total_http_requests"), the total number of unique source IP addresses seen in legitimate login requests to the site during the time period ("normal_distribution"→"statistics"→"total_ips"), and the total number of usernames used in legitimate login requests to the site during the time period ("normal_distribution"→"statistics"→"total_usernames"). The distributions for legitimate login requests include a distribution based on ASN (autonomous system number), a distribution based on user agent, a distribution based on client application, and a distribution based on originating country. The distribution based on ASN ("normal_distribution"→"asn") indicates, for each ASN, the name of the ASN ("normal_distribution"→"asn"→"name"), the number of legitimate login requests originating from the ASN ("normal_distribution"→"asn"→"total"), the number of unique source IP addresses seen in legitimate login requests originating from the ASN ("normal_distribution"→"asn"→"ip_count"), the number of unique usernames used in legitimate login requests originating from the ASN ("normal_distribution"→"asn"→ "usersname_count"), and the number of legitimate login requests originating from the ASN that resulted in a successful login ("normal_distribution"→"asn"→"success_logins_count"). The distribution based on user agent (normal_distribution"→"user_agent") (e.g., "User-Agent" included in the HTTP header), the distribution based on client application ("normal_distribution"→"client application") (e.g., Firefox®, Chrome®, bot, etc.), and the distribution based on originating country ("normal_distribution"→"country_code") may indicate similar statistics/counts/metrics as those discussed above with regard to the distribution based on ASN (e.g., number of legitimate login requests, number of unique source IP addresses, number of unique usernames, and/or number of legitimate login requests that resulted in a successful login) but applied to different feature groupings (e.g., groupings based on the user agent that originated the login request, the type of client application that originated the login request, and/or the country that originated the login request). The example site profile 260 also indicates statistics and distributions for attacker login requests ("attacker_distribution"). The statistics and distributions for attacker login requests may be similar to the statistics and distributions for legitimate login requests described above but applied to attacker login requests (instead of legitimate login requests).

Figure 3:
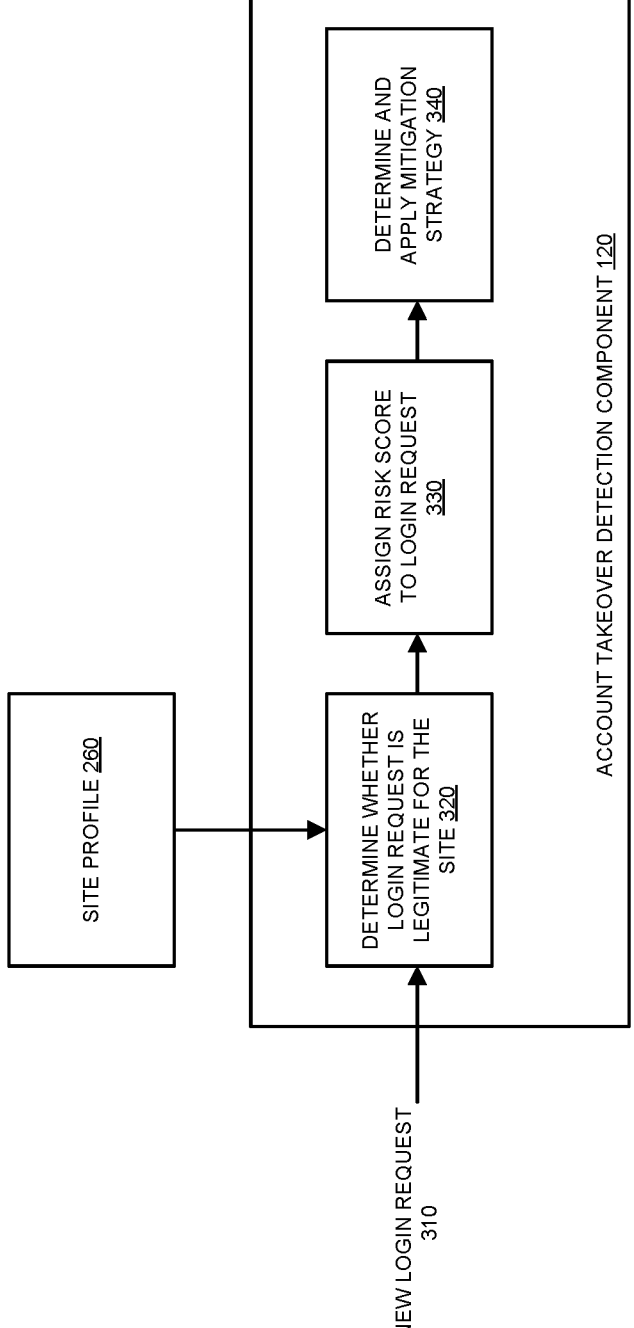
FIG. 3 is a diagram showing how the account takeover detection component can detect and mitigate account takeover attempts, according to some embodiments.

FIG. 3 is a diagram showing how the account takeover detection component can detect and mitigate account takeover attempts, according to some embodiments.

When the account takeover detection component 180 receives a new login request 310 to a site, it determines whether the login request is legitimate for the site (operation 320). The account takeover detection component 180 may determine whether the login request 310 is legitimate for the site based on comparing the login request 310 against a site profile 260 for the site (e.g., the site profile 260 may have been generated by a site profiler component 140 (e.g., as described above with reference to FIG. 2) and provided to the account takeover detection component 180). In an embodiment, determining whether the login request 310 is legitimate for the site involves obtaining information regarding the login request 310 (e.g., by extracting information from the login request 310 itself or from contextual information regarding the context surrounding the login request 310) and comparing this information against the statistics and/or distributions included in the site profile 260 for the site. The result of the determination of whether the login request is legitimate may be a binary value (e.g., true/false) indicating whether the login request is legitimate for the site or not or may be a value indicating the level of confidence that the login request is legitimate (e.g., a value ranging from 1 to 10, where a value of 1 indicates the lowest confidence and a value of 10 indicates the highest confidence).

The account takeover detection component 180 may then assign a risk score to the login request 310 based, at least in part, on a result of the determination of whether the login request 310 is legitimate for the site (operation 330). The risk score assigned to the login request 310 may indicate the level of (security) risk that the login request 310 presents and may be determined by various risk factors, one of which is the result of the determination of whether the login request 310 is legitimate for the site. The other risk factors may include, for example, the rate of recent login attempts from the IP address, IP reputation, and/or signature/fingerprint reputation. In an embodiment, the possible risk scores are "high," "medium," and "low," where "high" indicates a high security risk, "medium" indicates a medium security risk, and "low" indicates a low security risk, although other scoring conventions (e.g., having more or less granularity) are possible.

As an example, the account takeover detection component 120 may determine that the login request 310 is not legitimate for the site if it originated from a type of client application that is rarely used to access the site (e.g., the login request 310 originated from a non-mobile application and the site profile for the site indicates that 99% of legitimate login requests to the site originate from the site's mobile application). In this case, the account takeover detection component 120 may assign a higher risk score (indicating higher level of security risk) to the login request 310 (relative to the risk score that would have been assigned to the login request 310 if the login request 310 was determined to be legitimate for the site).

As another example, the account takeover detection component 120 may determine that the login request 310 is not legitimate for the site if it originated from a country that is unusual for the site and/or originated from a country that is associated with previous account takeover attempts on the site (e.g., the login request 310 originated from a particular country and the site profile for the site indicates that very few legitimate login requests to the site originate from that particular country and/or that 80% of attacker login requests to the site originate from that particular country). In this case, the account takeover detection component 120 may assign a higher risk score (indicating higher level of security risk) to the login request 310 (relative to the risk score that would have been assigned to the login request 310 if the login request 310 was determined to be legitimate for the site).

As another example, the account takeover detection component 120 may determine that the login request 310 is not legitimate for the site if it is associated with a TLS fingerprint that is unusual for the site (e.g., the site profile for the site indicates that there are three "main" TLS fingerprints that are used to access the site (e.g., 90% of login requests are associated with one of these three TLS fingerprints), but the login request 310 is associated with a TLS fingerprint that has never been seen for this site). In this case, the account takeover detection component 120 may assign a higher risk score (indicating higher level of security risk) to the login request 310 (relative to the risk score that would have been assigned to the login request 310 if the login request 310 was determined to be legitimate for the site).

For some sites, all legitimate traffic to the site is routed through a specific set of IP addresses or ASNs. This information may be captured/stored in the site profile for such a site. The account takeover detection component 180 120 may then use this the site profile to determine when login requests to the site originate from IP addresses and/or ASNs outside of the specific set of IP addresses or ASNs, and designate such login requests as not being legitimate for the site.

The examples provided above determine whether the login request 310 is legitimate based on whether a particular feature associated with the login request 310 (e.g., client application type, originating country, TLS fingerprint, or ASN) is common or uncommon/unusual for the site (e.g., which can be inferred/obtained from the counts (e.g., "normal_distribution"→"asn"→"total") included in the distributions). In some embodiments, the legitimacy of a particular feature is determined based on other statistics/counts besides how common/uncommon it is. For example, a particular client application may be considered to be more legitimate if there are many unique IP addresses that send login requests using that particular client application (e.g., which can be inferred/obtained from the unique IP address count (e.g., "normal distribution"→"client_application"→"ip_count") included in the distribution) and/or the success rate of login requests using that particular client application (e.g., which can be inferred/obtained from the success count (e.g., "normal distribution"→"client_application"→"success_logins_count") included in the distribution) is high. While certain examples are provided above to help illustrate embodiments, those skilled in the art will appreciate that there can be other ways to use a site profile to determine whether a login request is legitimate. Thus, the examples provided above should be construed as being illustrative, rather than limiting.

The account takeover detection component 180 may then determine a mitigation strategy for the login request 310 based on the risk score and apply that mitigation strategy to the login request 310 (operation 340). In an embodiment, the possible mitigation strategies include blocking the login request 310 ("block"), serving a CAPTCHA or similar challenge-response test to the user ("serve CAPTCHA), or allowing the login request 310 to proceed ("allow"). In an embodiment, each possible risk score is associated with a mitigation strategy. The association between risk scores and mitigation strategies may be configurable by an owner/administrator of the site or the account takeover detection component 180. For example, the "high" risk score may be associated with the "block" mitigation strategy, the "medium" risk score may be associated with the "serve CAPTCHA" mitigation strategy, and the "low" risk score may be associated with the "allow" mitigation strategy. The account takeover detection component 120 may determine the mitigation strategy to apply to the login request 310 to be the mitigation strategy that is associated with the risk score assigned to the login request 310. For example, the account takeover detection component 120 may determine that the login request 310 should be blocked if the login request 310 is assigned a "high" risk score, determine that a CAPTCHA should be served to the user if the login request 310 is assigned a "medium" risk score, and determine that the login request 310 should be allowed to proceed if the login request is assigned a "low" risk score.

Thus, as described above, embodiments generate a site profile that is specific to a particular site and use this site profile to assign risk scores to login requests to the site. The risk scores may be used to determine the appropriate mitigation strategy that is to be applied to each login request. Advantageously, embodiments are able to quickly detect and mitigate account takeover attempts even from "new" devices/signatures/fingerprints or IP addresses that have not been seen before (e.g., since they do not exclusively rely on building a reputation).

FIG. 4 is a flow diagram of a method for detecting and mitigating account takeover attempts, according to some embodiments. In an embodiment, the method is carried out by one or more network devices.

The operations in the flow diagram are described with reference to the exemplary embodiments of the other diagrams. However, it should be understood that the operations of the flow diagram can be performed by embodiments other than those discussed with reference to these other diagrams, and the embodiments discussed with reference to these other diagrams can perform operations different than those discussed with reference to the flow diagram. Also, while the flow diagram shows a particular order of operations performed by certain embodiments, it should be understood that such order is provided merely as one example (e.g., alternative embodiments may perform the operations in a different order, combine certain operations, overlap certain operations, etc.).

At operation 410, the one or more network devices generate a site profile for a site based on analyzing historical login requests to the site, wherein the site profile for the site includes information regarding legitimate login requests to the site and information regarding attacker login requests to the site. In an embodiment, the information regarding legitimate login requests to the site includes one or more of: a total number of legitimate login requests to the site during a time period, a total number of unique source IP addresses seen in legitimate login requests to the site during the time period, and a total number of unique usernames used in legitimate login requests to the site. In an embodiment, the information regarding legitimate login requests to the site includes one or more of: a distribution based on ASN, a distribution based on originating country, a distribution based on a signature or fingerprint, a distribution based on user agent, and a distribution based on client application. In an embodiment, the information regarding attacker login requests to the site includes one or more of: a total number of attacker login requests to the site during a time period, a total number of unique source IP addresses seen in attacker login requests to the site during the time period, and a total number of unique usernames used in attacker login requests to the site during the time period. In an embodiment, the information regarding attacker login requests to the site includes one or more of: a distribution based on ASN, a distribution based on originating country, a distribution based on a signature or fingerprint, a distribution based on user agent, and a distribution based on client application.

At operation 420, the one or more network devices intercept a login request to the site. The login request may have been sent by a client to a server hosting the site.

At operation 430, the one or more network devices determine whether the login request is legitimate for the site based on comparing the login request against the site profile for the site.

At operation 440, the one or more network devices assign a risk score to the login request based at least in part on a result of the determination of whether the login request is legitimate for the site. In an embodiment, the risk score assigned to the login request is one of a plurality of possible risk scores, wherein each of the plurality of possible risk scores is associated with a mitigation strategy.

At operation 450, the one or more network devices determine a mitigation strategy to apply to the login request based on the risk score assigned to the login request. In an embodiment, the one or more network devices determine the mitigation strategy to apply to the login request to be the mitigation strategy that is associated with the risk score. In an embodiment, the mitigation strategy is any one of: block the login request, serve a challenge-response test (e.g., a CAPTCHA), and allow the login request.

At operation 460, the one or more network devices cause the mitigation strategy to be applied to the login request. In an embodiment, the one or more network devices themselves apply the mitigation strategy to the login request, while in other embodiments, the one or more network devices cause another network device (e.g., a web application firewall or other security mechanism/device) to apply the mitigation strategy.

In an embodiment, the one or more network devices generate one or more other site profiles for one or more other sites and determines whether login requests to the one or more other sites are legitimate for the one or more other sites based on comparing each of the login requests against a corresponding security profile from the one or more other site profiles for the one or more other sites.

Figure 5:
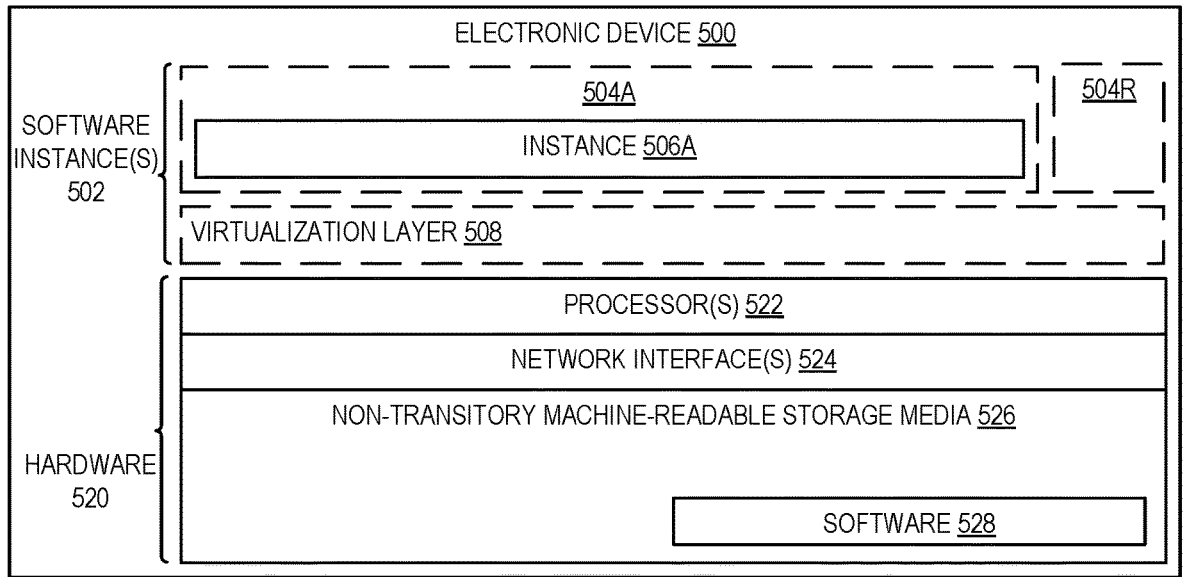
FIG. 5 is a diagram showing an electronic device, according to some embodiments.

FIG. 5 is a diagram showing an electronic device, according to some embodiments. FIG. 5 illustrates hardware 520 comprising a set of one or more processor(s) 522, a set of one or more network interfaces 524 (wireless and/or wired), and non-transitory machine-readable storage medium/media 526 having stored therein software 528 (which includes instructions executable by the set of one or more processor(s) 522). Software 528 can include code, which when executed by hardware 520, causes the electronic device 500 to perform operations of one or more embodiments described herein (e.g., operations for generating detecting and mitigating account takeover attempts). Thus, account takeover detection component 120 and/or the site profiler component 140 may each be implemented by one or more electronic devices.

In electronic devices that use compute virtualization, the set of one or more processor(s) 522 typically execute software to instantiate a virtualization layer 508 and software container(s) 504A-R (e.g., with operating system-level virtualization, the virtualization layer 508 represents the kernel of an operating system (or a shim executing on a base operating system) that allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 528 (illustrated as instance 506A) is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended example embodiments. The description is thus to be regarded as illustrative instead of limiting.

What is claimed is:

1. A method implemented by a network device to detect and mitigate account takeover attempts, the method comprising:

generating a site profile for a site based on analyzing historical login requests to the site, wherein the site profile for the site includes information regarding legitimate login requests to the site and information regarding attacker login requests to the site, the information regarding the legitimate login requests comprises at least one of statistics and distributions regarding the legitimate login requests to the site, and the information regarding the attacker login requests comprises at least one of statistics and distributions regarding the attacker login requests to the site;

intercepting a login request to the site;

determining whether the login request is legitimate for the site based on comparing the login request against the site profile for the site;

assigning a risk score to the login request based at least in part on a result of the determination of whether the login request is legitimate for the site;

determining a mitigation strategy to apply to the login request based on the risk score assigned to the login request; and causing the mitigation strategy to be applied to the login request.

2. The method of claim 1, wherein the information regarding legitimate login requests to the site includes one or more of: a total number of legitimate login requests to the site during a time period, a total number of unique source internet protocol (IP) addresses seen in legitimate login requests to the site during the time period, and a total number of unique usernames used in legitimate login requests to the site.

3. The method of claim 1, wherein the information regarding legitimate login requests to the site includes one or more of: a distribution based on autonomous system number (ASN), a distribution based on originating country, a distribution based on a signature or fingerprint, a distribution based on user agent, and a distribution based on client application.

4. The method of claim 1, wherein the information regarding attacker login requests to the site includes one or more of: a total number of attacker login requests to the site during a time period, a total number of unique source internet protocol (IP) addresses seen in attacker login requests to the site during the time period, and a total number of unique usernames used in attacker login requests to the site during the time period.

5. The method of claim 1, wherein the information regarding attacker login requests to the site includes one or more of: a distribution based on autonomous system number (ASN), a distribution based on originating country, a distribution based on a signature or fingerprint, a distribution based on user agent, and a distribution based on client application.

6. The method of claim 1, wherein the mitigation strategy is any one of: block the login request, serve a challenge response test, and allow the login request.

7. The method of claim 1, wherein the risk score assigned to the login request is one of a plurality of possible risk scores, wherein each of the plurality of possible risk scores is associated with a mitigation strategy.

8. The method of claim 1, further comprising: generating one or more other site profiles for one or more other sites; and determining whether login requests to the one or more other sites are legitimate for the one or more other sites based on comparing each of the login requests against a corresponding security profile from the one or more other site profiles for the one or more other sites.

9. A set of one or more non-transitory machine-readable storage media storing instructions which, when executed by one or more processors of one or more network devices, causes the one or more network devices to perform operations for detecting and mitigating account takeover attempts, the operations comprising:

generating a site profile for a site based on analyzing historical login requests to the site, wherein the site profile for the site includes information regarding legitimate login requests to the site and/or information regarding attacker login requests to the site, the information regarding the legitimate login requests comprises at least one of statistics and distributions regarding the legitimate login requests to the site, and the information regarding the attacker login requests comprises at least one of statistics and distributions regarding the attacker login requests to the site;

intercepting a login request to the site;

determining whether the login request is legitimate for the site based on comparing the login request to the site profile for the site;

assigning a risk score to the login request based at least in part on a result of the determination of whether the login request is legitimate for the site;

determining a mitigation strategy to apply to the login request based on the risk score assigned to the login request; and causing the mitigation strategy to be applied to the login request.

10. The set of one or more non-transitory machine readable storage media of claim 9, wherein the information regarding legitimate login requests to the site includes one or more of: a total number of legitimate login requests to the site during a time period, a total number of unique source internet protocol (IP) addresses seen in legitimate login requests to the site during the time period, and a total number of unique usernames used in legitimate login requests to the site.

11. The set of one or more non-transitory machine readable storage media of claim 9, wherein the information regarding legitimate login requests to the site includes one or more of: a distribution based on autonomous system number (ASN), a distribution based on originating country, a distribution based on a signature or fingerprint, a distribution based on user agent, and a distribution based on client application.

12. The set of one or more non-transitory machine readable storage media of claim 9, wherein the information regarding attacker login requests to the site includes one or more of: a total number of attacker login requests to the site during a time period, a total number of unique source internet protocol (IP) addresses seen in attacker login requests to the site during the time period, and a total number of unique usernames used in attacker login requests to the site during the time period.

13. The set of one or more non-transitory machine readable storage media of claim 9, wherein the information regarding attacker login requests to the site includes one or more of: a distribution based on autonomous system number (ASN), a distribution based on originating country, a distribution based on a signature or fingerprint, a distribution based on user agent, and a distribution based on client application.

14. The set of one or more non-transitory machine readable storage media of claim 9, wherein the operations further comprise:

generating one or more other site profiles for one or more other sites; and determining whether login requests to the one or more other sites are legitimate for the one or more other sites based on comparing each of the login requests against a corresponding security profile from the one or more other site profiles for the one or more other sites.

15. A network device configured to detect and mitigate account takeover attempts, the network device comprising:

one or more processors; and a non-transitory machine-readable storage medium having instructions stored therein, which when executed by the one or more processors, causes the network device to:

generate a site profile for a site based on analyzing historical login requests to the site, wherein the site profile for the site includes information regarding legitimate login requests to the site and/or information regarding attacker login requests to the site, the information regarding the legitimate login requests comprises at least one of statistics and distributions regarding the legitimate login requests to the site, and the information regarding the attacker login requests comprises at least one of statistics and distributions regarding the attacker login requests to the site;

intercept a login request to the site;

determine whether the login request is legitimate for the site based on comparing the login request to the site profile for the site;

assign a risk score to the login request based at least in part on a result of the determination of whether the login request is legitimate for the site;

determine a mitigation strategy to apply to the login request based on the risk score assigned to the login request; and causing the mitigation strategy to be applied to the login request.

16. The network device of claim 15, wherein the information regarding legitimate login requests to the site includes one or more of: a total number of legitimate login requests to the site during a time period, a total number of unique source internet protocol (IP) addresses seen in legitimate login requests to the site during the time period, and a total number of unique usernames used in legitimate login requests to the site.

17. The network device of claim 15, wherein the information regarding legitimate login requests to the site includes one or more of: a distribution based on autonomous system number (ASN), a distribution based on originating country, a distribution based on a signature or fingerprint, a distribution based on user agent, and a distribution based on client application.

18. The network device of claim 15, wherein the information regarding attacker login requests to the site includes one or more of: a total number of attacker login requests to the site during a time period, a total number of unique source internet protocol (IP) addresses seen in attacker login requests to the site during the time period, and a total number of unique usernames used in attacker login requests to the site during the time period.

19. The network device of claim 15, wherein the information regarding attacker login requests to the site includes one or more of: a distribution based on autonomous system number (ASN), a distribution based on originating country, a distribution based on a signature or fingerprint, a distribution based on user agent, and a distribution based on client application.

20. The network device of claim 15, wherein the instructions, when executed by the one or more processors, further causes the network device to:

generate one or more other site profiles for one or more other sites; and determine whether login requests to the one or more other sites are legitimate for the one or more other sites based on comparing each of the login requests against a corresponding security profile from the one or more other site profiles for the one or more other sites.

\* \* \* \* \*